(12) United States Patent
Sun

(10) Patent No.: US 8,517,674 B2
(45) Date of Patent: Aug. 27, 2013

(54) FAN AND FAN ASSEMBLY

(75) Inventor: Zheng-Heng Sun, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 415 days.

(21) Appl. No.: 12/912,758

(22) Filed: Oct. 27, 2010

(65) Prior Publication Data

US 2011/0038720 A1 Feb. 17, 2011

(51) Int. Cl.
*F04D 29/58* (2006.01)

(52) U.S. Cl.
USPC .................. 415/178; 415/213.1; 415/220

(58) Field of Classification Search
USPC .............. 415/213.1, 178, 220, 177; 361/695
See application file for complete search history.

(56) References Cited

U.S. PATENT DOCUMENTS 7,826,224 B2 * 11/2010 Sun ........................... 361/697

* cited by examiner

*Primary Examiner* — Edward Look
*Assistant Examiner* — William Grigos
(74) *Attorney, Agent, or Firm* — Altis Law Group, Inc.

(57) ABSTRACT

An assembly includes a fan and a heat sink for detachably fixing the fan. The fan includes a pair of first and a pair of second sidewalls, with two pair of rims respectively extending from the first and second sidewalls. Ends of the rims of the first sidewalls, which are directed toward and are adjacent to a same one of the second sidewalls, each have a latch flange. Ends of the rims of the second sidewalls, which are directed toward and are adjacent to a same one of the first sidewalls, each have a latch flange. The heat sink includes a channel for slidably receiving one pair of rims of the first or second sidewalls, a blocking member disposed at one end of the channel to block a corresponding sidewall of the fan, and a latch member disposed at the other end of the channel to latch the corresponding latch flanges.

6 Claims, 5 Drawing Sheets

FAN AND FAN ASSEMBLY

CROSS REFERENCE TO RELATED APPLICATIONS

This present application is a divisional application of U.S. patent application, entitled "FAN AND FAN ASSEMBLY", with application Ser. No. 12/344,259, filed on Dec. 25, 2008, which claims foreign priority based on Chinese Patent application No. 200810304329.1, filed on China on Sep. 1, 2008. The content of the above-referenced applications are hereby incorporated by reference.

BACKGROUND

1. Technical Field

The present disclosure relates to heat-dissipating components and, particularly, to a fan and fan assembly.

2. Description of Related Art

In many computer systems, fans are secured by screws or the like to an enclosure of the computer system to cool electrical components within the enclosure. However, as computer systems become smaller in size, the components become more tightly arranged within the enclosure. Although tools can be used to deal with the screws, the limited amount of space within the enclosure makes it easy to accidentally damage components with the tools. In addition, the installation or removal of the screws is time consuming and troublesome.

DETAILED DESCRIPTION

Figure 1:
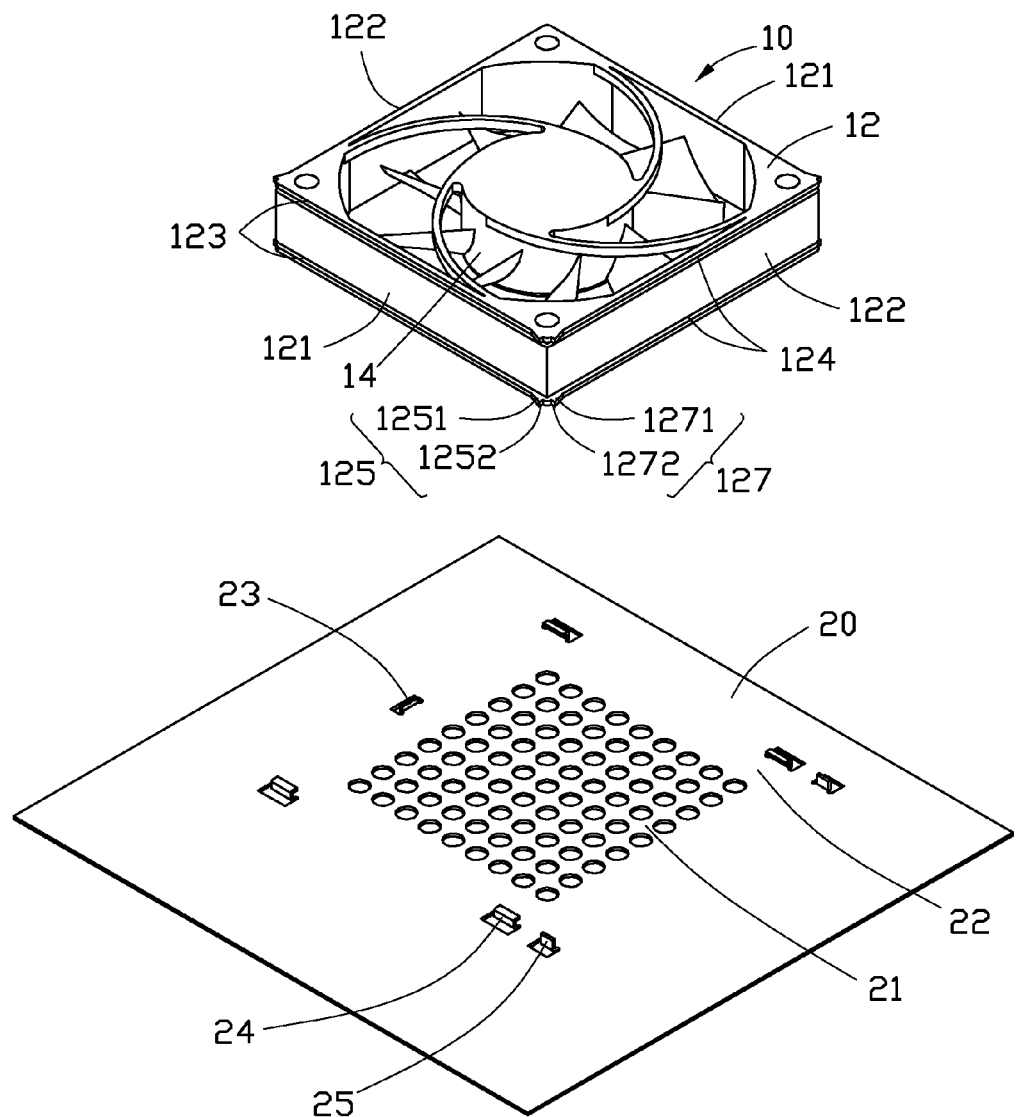
FIGS. 1 and 2 are exploded, isometric views of a first embodiment of a fan assembly.
Figure 2:
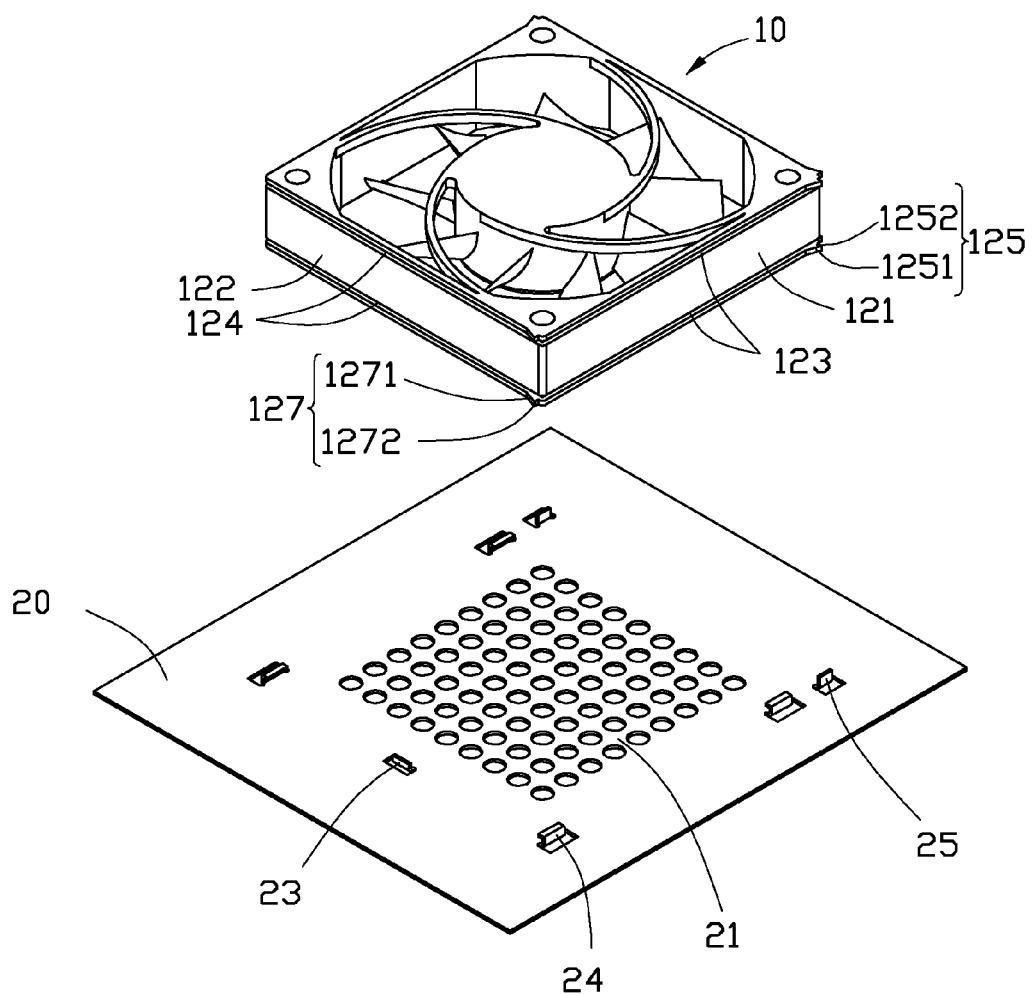
Figure 3:
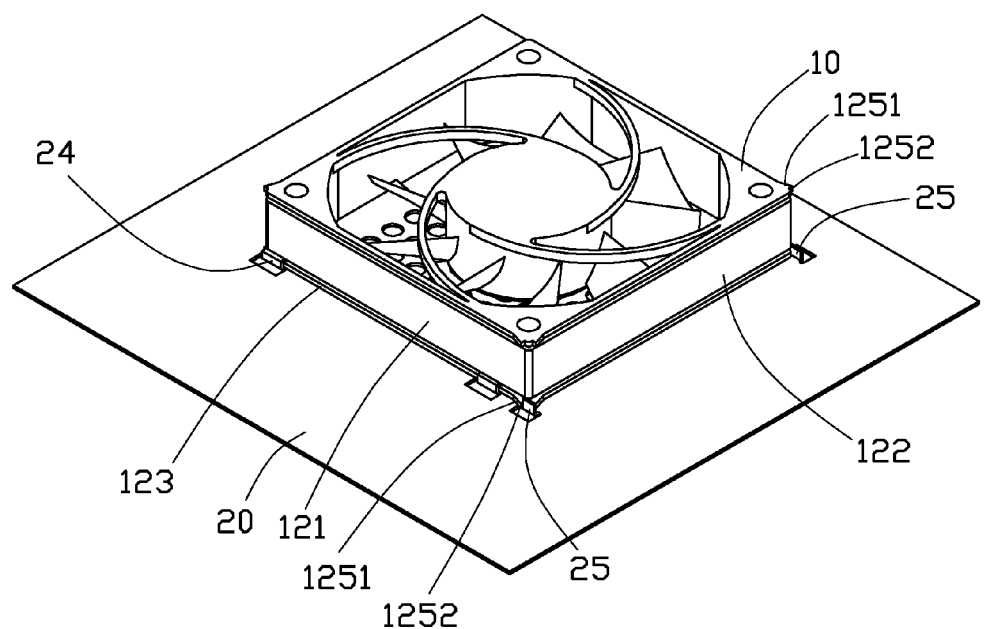
FIG. 3 is an assembled, isometric view of the fan assembly of FIG. 1.

Referring to FIGS. 1 to 3, an embodiment of a fan 10 includes a fan body 14, and a frame 12 configured for holding the fan body 14 therein. The frame 12 includes two first parallel sidewalls 121, and two second parallel sidewalls 122 perpendicular to the first sidewalls 121. Each of the first sidewalls 121 includes two rims 123 symmetrically extending from bottom and top edges thereof. Each of the second sidewalls 122 includes two rims 124 symmetrically extending from bottom and top edges thereof. Ends of the rims 123 which are directed toward and adjacent to the same second sidewall 122 (that is, the two right ends of the rims 123 in FIG. 1), each include a triangular latch flange 125 extending therefrom perpendicular to the first sidewalls 121. Each of the latch flanges 125 includes a guiding edge 1251 slantingly extending from the rim 123, and a latch edge 1252 perpendicular to the guiding edge 1251. Ends of the rims 124 which are directed toward and adjacent to the same first sidewall 121 (that is, the two left ends of the rims 124 in FIG. 1), each include a triangular latch flange 127 formed thereat. Each of the latch flanges 127 includes a guiding edge 1271 slantingly extending from the rim 124, and a latch edge 1272 perpendicular to the guiding edge 1271.

A first embodiment of a fan assembly includes the fan 10, and a fixing device. In the first embodiment, the fixing device is a plate 20 of an electronic device.

The plate 20 includes a rectangular ventilation area 21. Two lines of L-shaped hooks 24 which extend perpendicularly from the plate 20 and bend toward each other are arranged at two opposite first edges of the ventilation area 21, to define a channel 22 therebetween. Each line includes two hooks 24. A latch member and a block member are disposed at two ends of the channel 22. In this embodiment, the latch member is two resilient latch tabs 25 perpendicularly extending from the plate 20, respectively in alignment with the two lines of the hooks 24. The blocking member is a blocking tab 23 perpendicularly extending from the plate 20 along a second edge of the ventilation area 21 perpendicular to the first edges.

In this illustrated embodiment, the bottom of the fan 10 is attached to the plate 20 in a direction parallel to the first sidewalls 121 of the fan 10, with the bottom rims 123 of the first sidewalls 121 slidably engaging with the hooks 24 and received in the channel 22. The guiding edges 1251 of the latch flanges 125 of the first sidewalls 121 slidably pass over the latch tabs 25, with the latch edges 1252 blocked by the latch flanges 125. At the same time, the bottom rim 124 on the left-hand second sidewall 123 is blocked by the blocking tab 23. Thus, the fan 20 is fixed on the plate 20. In other embodiments, the fan 10 can be rotated 90, 180, or 270 degrees to be fixed on the plate 20. To detach the fan 10 from the plate 20, the latch tabs 25 are urged to disengage from the latch flanges 125, the fan 10 is easily slid out from the channel 22 of the plate 20.

Figure 4:
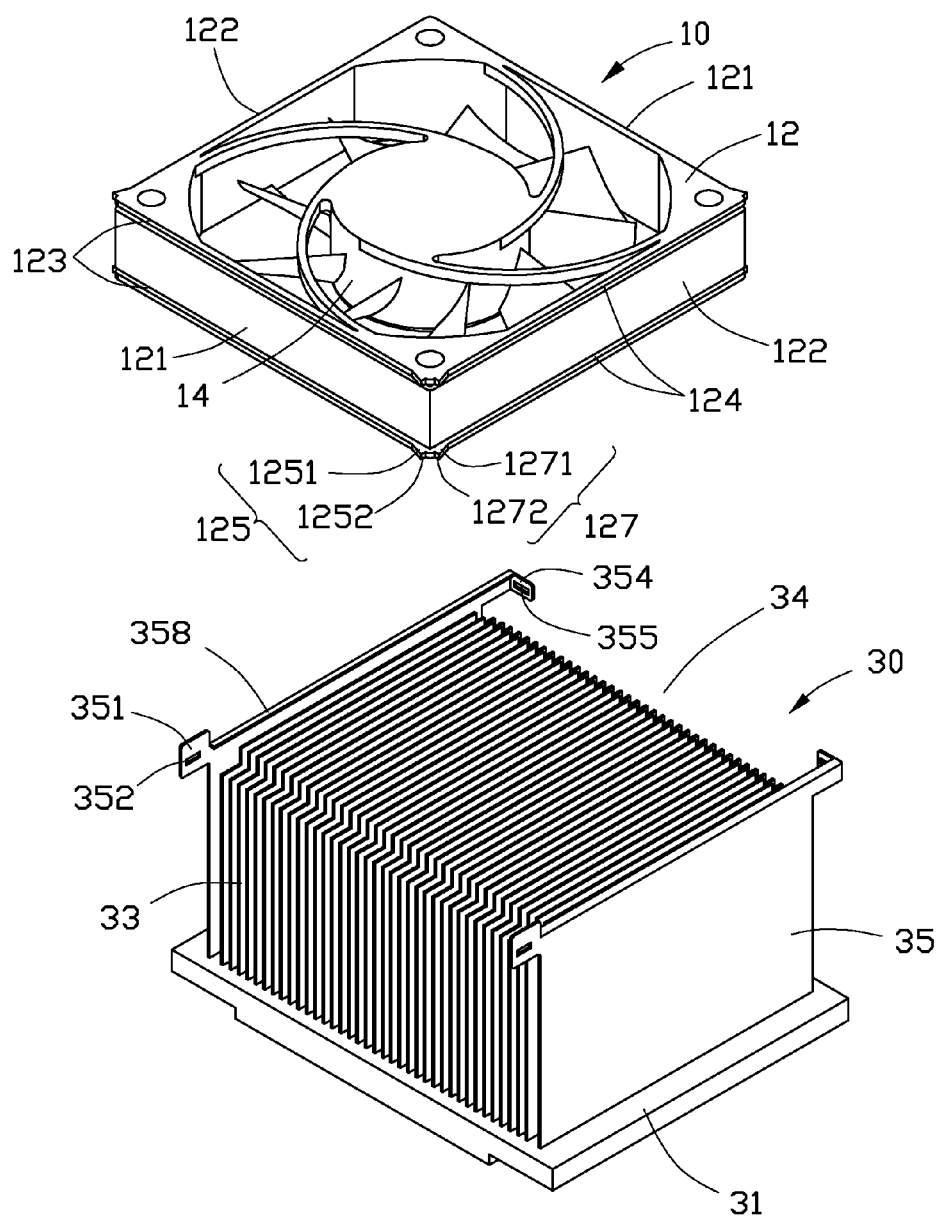
FIG. 4 is an exploded, isometric view of a second embodiment of a fan assembly.
Figure 5:
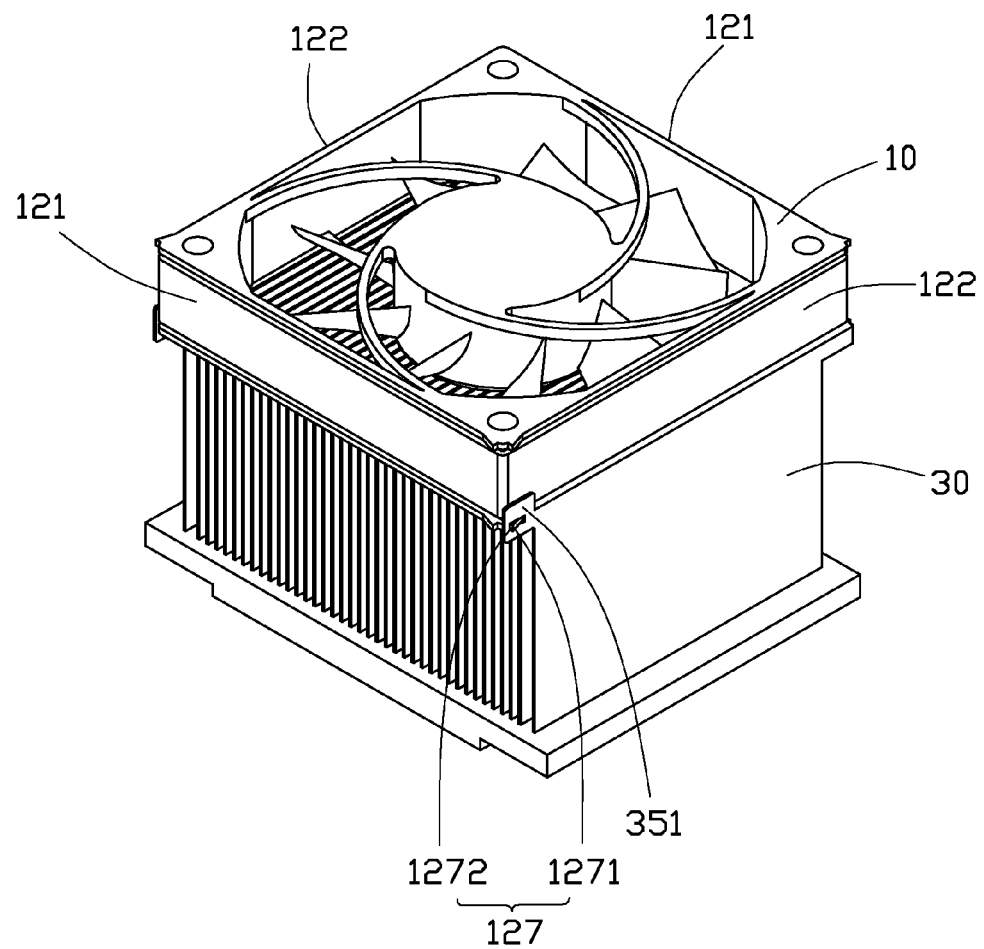
FIG. 5 is an assembled, isometric view of the fan assembly of FIG. 4.

Referring to FIGS. 4 and 5, a second embodiment of a fan assembly includes the fan 10, and a fixing device. In the second embodiment, the fixing device is a heat sink 30.

The heat sink 30 includes a base 31, a plurality of fins 33, and a pair of fixing boards 35 perpendicularly extending from the base 31. The fixing boards 35 are higher than the fins 33 and parallelly located outside the two outmost fins 33 of the heat sink 30. The fixing boards 35 include a pair of limiting flanges 358 extending perpendicularly and toward each other from top edges thereof. The fixing boards 35 and tops of the fins 33 define a channel 34 therebetween. A latch member and a block member are disposed at two ends of the channel 34. In this embodiment, the blocking member is a pair of blocking tabs 354 each with a rectangular through hole 355 extending from each fixing boards 35 near right ends of the limiting flanges 358. The latch member is a pair of tabs 351 each with a rectangular through hole 352 extending from left ends of each limiting flange 358 on a same plane.

In this illustrated embodiment, the bottom of the fan 10 is attached to the heat sink 30 in a direction perpendicular to the first sidewalls 121 of the fan 10, with the bottom rims 124 of the second sidewalls 122 slidably engaging with the limiting flanges 358 of the fixing boards 35 of the heat sink 30 and received in the channel 34. The guiding edges 1271 of the latch flanges 127 of the second sidewalls 122 slide along inside surfaces of the latch tabs 351 and then extend into the rectangular through holes 352, with edges of the rectangular through holes 352 latching the latch edges 1272 of the latch flanges 127. At the same time, the bottom rim 123 on the right first sidewall 121 is blocked by the blocking tabs 354 and the latch flange 125 on the right first sidewall 121 extends into the through hole 355 of the corresponding blocking tab 354. Thus, the fan 20 is fixed on the heat sink 30. In other embodiments, the fan 10 can be turned upside down, and/or rotated 90, 180, or 270 degrees to be fixed on the heat sink 30. To detach the fan 10 from the heat sink 30, the latch tabs 351 are urged to disengage from the latch flanges 127, the fan 10 is easily slid out from the channel 34 of the heat sink 30.

It is to be understood, however, that even though numerous characteristics and advantages of the embodiments have been set forth in the foregoing description, together with details of the structure and function of the embodiments, the disclosure is illustrative only, and changes may be made in details, especially in matters of shape, size, and arrangement of parts within the principles of the embodiments to the full extent indicated by the broad general meaning of the terms in which the appended claims are expressed.

What is claimed is:

1. A fan assembly comprising:
   a fan comprising a pair of first and a pair of second sidewalls, the first sidewalls perpendicular to the second sidewalk, a pair of rims symmetrically extending from the first sidewalk, a pair of rims symmetrically extending from the second sidewalls; ends of the rims of the first sidewalls, which are directed toward and adjacent to a same one of the second sidewalls, each comprising a latch flange; ends of the rims of the second sidewalls, which are directed toward and adjacent to a same one of the first sidewalls, each comprising a latch flange; and
   a heat sink for detachably fixing the fan thereto and comprising a base, a plurality of fins extending from the base, and two fixing boards extending from opposite sides of the base, the fixing boards located at opposite sides of and being higher than the plurality of fins, the fixing boards comprising two limiting flanges perpendicularly extending from tops of the corresponding fixing boards and toward each other, a channel for slidably receiving one pair of rims of the first sidewalls or the second sidewalls defined between the fixing boards and tops of the fins, a blocking member disposed at one end of the channel to block a corresponding sidewall of the fan, and a latch member disposed at the other end of the channel to latch the corresponding latch flanges;
   wherein the rims extend from bottom edges of the first and second sidewalls.

2. The fan assembly of claim 1, wherein the blocking member is a pair of blocking tabs each with a rectangular through hole extending from first ends of the limiting flanges.

3. The fan assembly of claim 2, wherein the latch member is a pair of latch tabs each with a rectangular through hole extending from second ends of the limiting flanges on a same plane for engaging with the corresponding latch flanges.

4. The fan assembly of claim 3, wherein each latch flange comprises a guiding edge slantingly extending from the corresponding rim to move relative to the corresponding latch flange, and a latch edge perpendicular to the corresponding rim to be blocked by a wall bounding the through hole of the corresponding latch tab.

5. The fan assembly of claim 1, wherein each of the first and second sidewalk further comprises a rim extending from a top edge thereof, with a same structure as the rim located at the bottom edge.

6. The fan assembly of claim 1, wherein each of the latch flanges is perpendicular to the corresponding first or second sidewall.

* * * * *